(12) United States Patent
Hurlin et al.

(10) Patent No.: US 8,839,629 B2
(45) Date of Patent: Sep. 23, 2014

(54) ASSEMBLY FOR ATTACHING THE HANGERS FROM WHICH AN AIRCRAFT PROPULSION UNIT IS SUSPENDED

(71) Applicants: Aircelle, Gonfreville l'Orcher (FR); Snecma, Paris (FR)

(72) Inventors: Herve Hurlin, Igny (FR); Nicolas Dezeustre, Le Havre (FR); Wouter Balk, Melun (FR); Gilles Charier, La Grande Paroisse (FR)

(73) Assignees: Aircelle, Gonfreville l'Orcher (FR); SNECMA, Paris (FR)

( * ) Notice: Subject to any disclaimer, the term of this patent is extended or adjusted under 35 U.S.C. 154(b) by 0 days.

(21) Appl. No.: 13/862,724

(22) Filed: Apr. 15, 2013

(65) Prior Publication Data

US 2013/0227963 A1 Sep. 5, 2013

Related U.S. Application Data

(63) Continuation of application No. PCT/FR2011/052307, filed on Oct. 4, 2011.

(30) Foreign Application Priority Data

Oct. 15, 2010 (FR) ...................... 10 58406

(51) Int. Cl.
*B64D 27/26* (2006.01)

(52) U.S. Cl.
CPC .......... *B64D 27/26* (2013.01); *B64D 2027/266* (2013.01)
USPC ............................... 60/796; 244/54; 248/554

(58) Field of Classification Search
CPC ............ B64D 27/26; B64D 2027/266; B64D 2027/262; F02C 7/20
USPC ................ 60/797, 796, 798; 244/54; 248/554
See application file for complete search history.

(56) References Cited

U.S. PATENT DOCUMENTS

| | | | | |
|---|---|---|---|---|
| 3,844,115 A * | 10/1974 | Freid | | 60/797 |
| 5,620,154 A * | 4/1997 | Hey | | 244/54 |
| 5,649,417 A * | 7/1997 | Hey | | 60/797 |
| 6,189,830 B1 * | 2/2001 | Schnelz et al. | | 244/54 |
| 6,330,995 B1 * | 12/2001 | Mangeiga et al. | | 248/554 |
| 6,843,449 B1 | 1/2005 | Manteiga et al. | | |
| 7,325,770 B2 * | 2/2008 | Chevalier et al. | | 244/54 |
| 7,527,220 B2 * | 5/2009 | Dron | | 244/54 |

FOREIGN PATENT DOCUMENTS

| | | |
|---|---|---|
| EP | 1031507 A2 | 8/2000 |
| FR | 2940359 A1 | 6/2010 |

* cited by examiner

*Primary Examiner* — William H Rodriguez
*Assistant Examiner* — Carlos A Rivera
(74) *Attorney, Agent, or Firm* — Brinks Gilson & Lione

(57) ABSTRACT

An assembly is designed to attach hangers from which an aircraft propulsion unit is suspended. The propulsion unit is intended to be suspended from a structural element of the aircraft. The propulsion unit includes a turbojet engine having a longitudinal axis and the attachment assembly having a clevis mount for attaching the hangers to a casing of the propulsion unit. The clevis mount is fixed to the casing by means designed to form a connection between the clevis mount and the casing at the external periphery of the casing.

8 Claims, 2 Drawing Sheets

Figure 1:
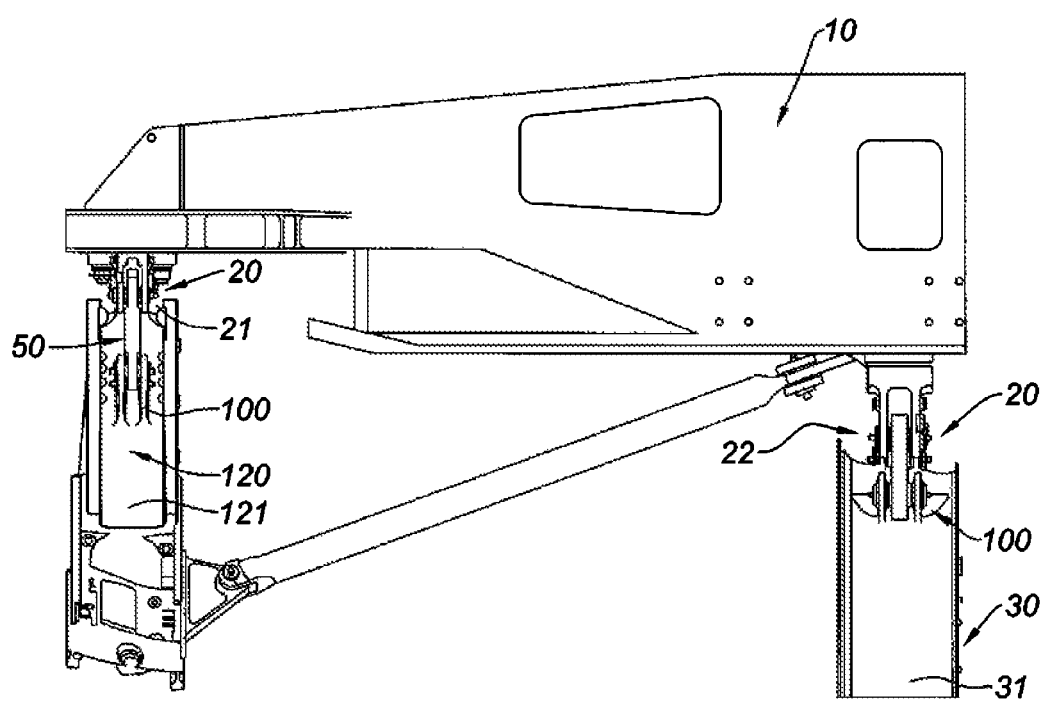

ASSEMBLY FOR ATTACHING THE HANGERS FROM WHICH AN AIRCRAFT PROPULSION UNIT IS SUSPENDED

CROSS-REFERENCE TO RELATED APPLICATIONS

This application is a continuation of International Application No. PCT/FR2011/052307 filed on Oct. 4, 2011, which claims the benefit of FR 10/58406, filed on Oct. 15, 2010. The disclosures of the above applications are incorporated herein by reference.

FIELD

The present disclosure relates to an assembly for attaching hangers from which an aircraft propulsion unit is suspended to a structural element of the aircraft, such as a wing or the fuselage of the aircraft for example, and more particularly an assembly for attaching those suspension hangers on said propulsion unit.

BACKGROUND

The statements in this section merely provide background information related to the present disclosure and may not constitute prior art.

A propulsion unit for an aircraft comprising a dual flow turbojet engine mounted inside in a nacelle delimiting a flow tunnel for a secondary flow can be mounted in various locations of the airplane while being attached to a mast belonging to the structure thereof.

It can thus be suspended under the wings, fastened to the fuselage, or mounted in the tail unit using attachment means that make it possible in particular to transmit the mechanical loads between the engine and the airplane structure to that wing, loads generated by the engine and loads coming from the nacelle transmitted by the engine during its various operating states.

The loads to be taken into consideration are oriented along the three main directions (forces and stresses). These are in particular the loads per unit of mass or inertia loads of the engine, its thrust, the aerodynamic loads, and the loads due to incidental or accidental operation (fan blade off, crash, etc.). The loads to be transmitted also comprise the reaction of the rotational torque around the engine shaft.

These attachment means must also absorb the deformations undergone by the engine during the different flight phases, in particular due to the dimensional variations due to the heat expansions or contractions and mechanical biases.

One suspension mode, for example, consists of attaching the engine to a mast arranged between the turbojet engine and the wing of the aircraft in the form of an elongated and rigid box capable of transmitting the loads (forces and stresses) in the three axial, lateral and vertical directions between the turbojet engine and the structure of the aircraft, the axis being that of the engine.

This mast, which extends in a vertical plane passing through the longitudinal axis of the engine, comprises suspension means for the engine through which all of the loads (forces and stresses) transmitted between the engine and the aircraft pass.

These suspension means comprise an upstream engine hanger in particular fastened on the intermediates casing of the turbojet engine and a downstream engine hanger in particular fastened on the exhaust casing of the turbojet engine.

Figure 3:
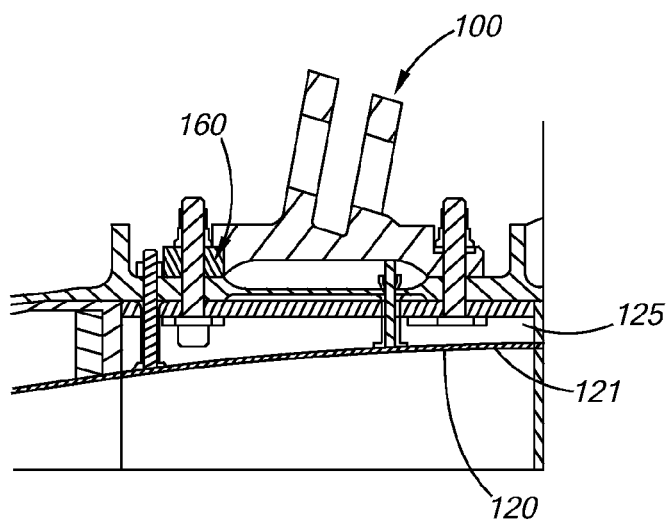

These hangers are mounted on the aforementioned casings by means of clevis mounts 100 mounted on the casings, as illustrated in one particular example of the intermediate casing 120 of the prior art in FIG. 3.

In this figure, one can see that a clevis mount 100 is fastened on the outer shroud 121 of the intermediate casing 120 by fastening means 160 radially passing through the outer shroud of the casing 120.

These fastening means 160 comprise screwing means of the nut screw type.

These fastening means also pass through the outlet guide vanes 125 fastened to the intermediate casing 120 inasmuch as the clevises 100 are mounted across from those vanes 125.

However, such an assembly of the clevis mounts 100 on a casing 120 is not satisfactory.

The strains exerted at the interface between the intermediate casing 120 and the clevis mount 100 can create a deterioration of the composite structure, such as delamination, in the casing frame made from a composite material.

The reliability of the assemblies of clevis mounts on the casing is thereby affected.

This assembly also requires taking down the hangers and therefore the engine if one wishes to disassemble a rectifier vane 125.

The present disclosure is designed to offset the aforementioned problems.

The present disclosure provides a simple, effective and inexpensive solution to these problems.

It is also desirable to propose an attachment assembly capable of eliminating any connection between the flow rectifying vanes and the clevis mounts of the hanger inserted between the propulsion unit and the mast designed to support it.

SUMMARY

The present disclosure proposes an assembly for attaching the hangers from which an aircraft propulsion unit is suspended, said propulsion unit being intended to be suspended from a structural element of the aircraft, said propulsion unit comprising a turbojet engine having a longitudinal axis, said attachment assembly comprising at least one clevis mount for attaching the hangers to a casing of said propulsion unit, characterized in that the clevis mount is fixed to said casing by means designed to form a connection between said clevis mount and said casing at the outer periphery of said casing.

Owing to the present disclosure, the risks of deterioration of the casing are limited relative to the mounting connections of the casing with the clevis mounts, by eliminating any assembly connection between the clevis mount and the casing inside said casing.

According to the present disclosure, the assembly may comprise one or more of the following features, considered alone or according to all technically possible combinations:
 said means are capable of forming a connection between the clevis mount and the casing along an axis parallel to the longitudinal axis of the turbojet engine;
 said means forming an axial connection along the longitudinal axis of the turbojet engine comprise at least one first eyelet designed to be secured to the clevis mount; at least one second eyelet designed to be secured to the outer periphery of the casing; and fastening means suitable for passing through said first and second eyelets along the longitudinal axis of the turbojet engine;
 said first eyelet is made in a fin integral with an ear of the clevis;

said second eyelet is made in an outer peripheral structural element of the casing designed to support that eyelet;

said outer peripheral structural element of the casing is a connecting flange, a stiffener or a dedicated structure;

the arrangement of the means forming an axial connection is identical on either side of each clevis mount or mounted in staggered rows;

the casing is a fan casing, an intermediate casing or an exhaust casing;

said outer peripheral structural element of the casing is formed on an outer shroud of the intermediate casing.

The present disclosure also relates to a propulsion unit comprising a turbojet engine suspended from a structural element of the aircraft by means of a hanger also comprising an assembly for attaching said hanger on a casing of the propulsion unit as described above.

Further areas of applicability will become apparent from the description provided herein. It should be understood that the description and specific examples are intended for purposes of illustration only and are not intended to limit the scope of the present disclosure.

DRAWINGS

Figure 2:
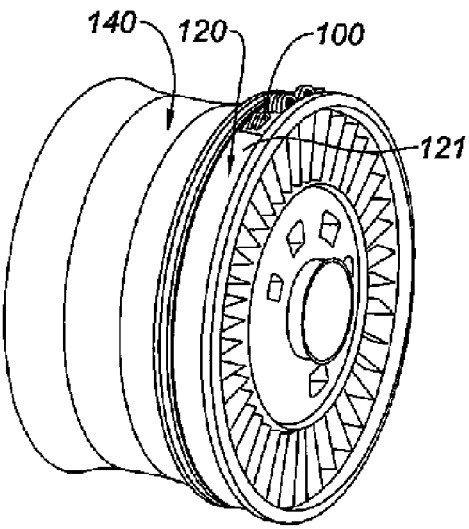
Figure 4:
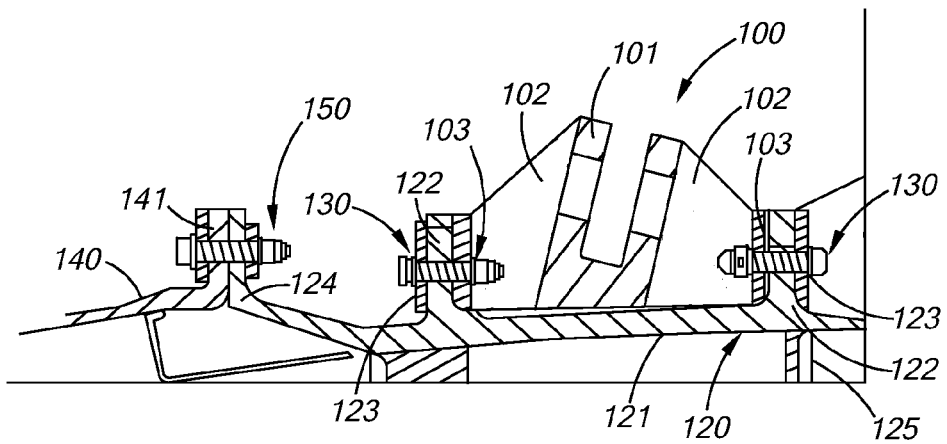

In order that the disclosure may be well understood, there will now be described various forms thereof, given by way of example, reference being made to the accompanying drawings, in which:

Other aspects, aims and advantages of the disclosure will appear upon reading the following detailed description of preferred forms thereof, provided as a non-limiting example and done in reference to the appended drawings, in which:

FIG. 1 is a lateral diagrammatic view of a hanger of an aircraft propulsion system, FIG. 2 is a diagrammatic perspective view of clevis mounts of a hanger mounted on a casing of the propulsion unit of FIG. 1, and FIGS. 3 and 4 are cross-sectional views of the connection between an intermediate casing and a clevis mount of a hanger of the propulsion unit of FIG. 1 relative to the prior art and according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the rest of the following description, by convention, X refers to the longitudinal direction of the turbojet engine. Additionally, Y refers to the direction comparable to the transverse direction of the turbojet engine, and Z the vertical direction or the height, these three directions X, Y and Z being orthogonal relative to one another.

Furthermore, the terms "upstream" and "downstream" should be considered relative to a direction of forward movement of the aircraft encountered following the thrust exerted by the turbojet engine.

Traditionally, an aircraft propulsion unit comprises a nacelle surrounding a turbojet engine that both have a longitudinal primary axis.

As is known in itself, the turbojet engine comprises a fan delivering an annular air flow with a primary flow that supplies the engine driving the fan and a secondary flow that is discharged into the atmosphere while providing a significant portion of the thrust of the aircraft.

The fan is contained in an outer casing that channels the secondary flow in the downstream direction, that flows passing through a wheel rotated inside the intermediate casing belonging to a middle section of the nacelle. Such a casing is illustrated in FIG. 1 with general reference 120.

As a reminder, the nacelle typically comprises an upstream air intake structure, a metal structure surrounding vanes of the fan of the turbojet engine, and a downstream structure capable of incorporating thrust reverser means.

This case also comprises an inner structure including a fairing of the engine downstream of the vanes of the fan and which defines, with the downstream structure, an annular air tunnel through which the secondary air flow is designed to circulate, as opposed to the primary hot flow created by the engine.

The fan is rotatably mounted on the stationary hub that may be connected to the fan casing by a plurality of stationary arms that can transmit part of the loads between the engine and its support. In this area, there are outlet guide vanes (OGV) making it possible to guide the secondary flow created by the fan and optionally transmit the loads toward the fan casing.

The intermediate casing 120 is thus a structural element that comprises the hub, an annular outer shroud 121 that supports the shroud of the fan casing at the downstream end thereof, any radial connecting arms that connect the hub to the outer shroud 121 and OGVs.

Furthermore, the tunnel of the secondary flow is inwardly delimited by a cylindrical enclosure that surrounds the body of the engine and extends from the hub of the intermediate casing 120 and exhaust casing 30 situated at the outlet of the turbine.

The turbojet engine of the propulsion unit is suspended from a structural element of the aircraft, for example under a wing, using a mast 10 that extends substantially in a vertical plane passing through the longitudinal axis of the turbojet engine, in the space situated between the body of the engine and the wing of the aircraft. However, the proposed disclosure may absolutely use any other type of turbojet engine attachment, for example on the fuselage or the tail unit.

This mast 10 includes a rigid structure, often of the "box" type, i.e., formed by assembling upper and lower beams and side panels connected to each other.

Hanger means 20 are provided to be inserted between the turbojet engine and the mast 10, so as to transmit the loads (forces and stresses) between the turbojet engine and the aircraft.

These hanger means 20, which are the assembly of the parts or members ensuring fastening of the engine and the transmission of loads (forces and stresses) between the engine and the mast 10, generally comprise at least one upstream engine attachment 21 between the outer shroud 121 of the intermediate casing and the mast 20, and a downstream engine attachment 22 between the outer shroud 31 of the exhaust casing 30 and the mast 20.

A device for reacting or transmitting thrust comprising two connecting rods which may be connected to each other by a rotor bar and mounted, for example, upstream on the fan casing and on the downstream motor attachment can also be provided.

Each upstream engine attachment 21 transmits part of the mechanical loads (forces and stresses) in all three directions between the turbojet engine and the aircraft.

Each downstream engine attachment 22 is arranged also to provide part of the mechanical loads (forces and stresses).

These engine attachments 21, 22 can be made in any form known by those skilled in the art, for example, such as that relative to the assembly of shackles and fittings designed to cooperate with an articulation system of the connecting rod type.

These are traditional elements identical or similar to those encountered in the prior art, and known by those skilled in the art. Consequently, a detailed description thereof will not be provided.

The assembly of these engine attachments 21, 22 is generally isostatic and provided with failsafe systems ensuring the redundancy of the transmission of loads (forces and stresses). However, non-isostatic solutions as well as non-failsafe solutions may exist.

These two types of attachments 21, 22 are mounted on the turbojet engine by means of clevis mounts 100 fastened on the fan casing, the intermediate casing 120 and/or the exhaust casing 30.

In reference to FIGS. 2 and 4, a clevis mount 100 is shown designed to cooperate with the hanger means and, more particularly, with an upstream engine attachment provided to be fastened to the outer shroud 121 of the intermediate casing 120.

Taking the example of an engine attachment with an articulation system of the connecting rod type as illustrated in FIG. 1, each clevis 100 is suitable for fastening the outer shroud 121 to the lower ends of suspension connecting rods whereof the upper ends are mounted on a fittings 50 arranged in a transverse plane relative to the axis X of the engine.

According to the present disclosure, each clevis mount 100 of the engine attachments 20 is fastened on the circumference of the outer shroud 121 of the casing 120 by suitable means for forming a connection between said clevis mount 100 and said casing 120 at the outer periphery of the shroud 121.

In one form, the connection is a connection along an axis parallel to the axis X of the turbojet engine.

In one alternative form, the connection is along an axis not parallel to the axis X of the turbojet engine.

Each clevis mount 100 can be described as follows.

Each clevis 100 comprises two parallel ears 101 inclined relative to a plane YZ, and designed to cooperate with the component elements of the hanger means.

At least one of said ears 101 is extended by a fin 102 protruding in a plane transverse to the corresponding ear 11 and in one non-limiting example oriented substantially along the axis X.

In this fin 102, at least one eyelet 103 is arranged suitable for receiving fastening means 130 designed to secure the clevis 100 to the outer shroud 121 of the intermediate casing 120.

The outer shroud 121 of the intermediate casing 120 in turn comprises at least one structural element protruding outward at its periphery and preferably, at least two structural elements respectively placed upstream and downstream of the clevis mount 100.

In a first alternative form, such a structural element may be a connecting flange 122 protruding outward at its periphery and, preferably, at least two connecting flanges 122 respectively placed upstream and downstream of the clevis mount 100.

Each connecting flange 122 comprises a connecting portion forming a flange extending in a radial direction, substantially in a plane YZ, in which at least one eyelet 123 is arranged across from an eyelet 123 of the clevis mount 100.

It should be noted that the connecting flanges 122 can be integrated into the casing 120 for example by being formed in a single piece or secured by welding or riveting, for example, to the intermediate casing 120.

Each connecting flange 122 and each fin 102 of the clevis 100 are made integral by suitable fastening means 130 designed to pass through the opposite eyelets 103, 123 in each of the flange 122 and the fin 102, which may or may not be parallel to the axis X of the turbojet engine.

These fastening means 130 may be of any known type, for example, nut-screw screwing means or any other element suitable for securing each flange 122 of the outer shroud 120 with a fin 102 of the clevis mount 100.

It should be noted that the connecting flanges 122 can be made from composite materials at the same time as the casing 120.

In other alternative forms, the structural element protruding outward at the periphery of the outer shroud 121 of the intermediate casing 120 can be a stiffener or any dedicated structure, irrespective of their length and designed to bear an eyelet.

Everything that has been described relative to the alternative form regarding the connecting flanges 122 can be applied to the other alternatives of the structural element.

The fastening means 130 can also play the role of positioning centering elements.

It should be noted that, preferably, as illustrated in FIG. 3, the arrangement of the means forming an axial connection is identical on either side of each clevis mount 100.

In non-limiting examples of forms, the arrangement of the means forming an axial connection is symmetrical or mounted in staggered rows on either side of each clevis mount 100.

In the example of an assembly in staggered rows, it is thus possible to provide two circumferential connecting flanges on either side of the hanger clevises in which openings are formed in staggered rows designed to receive the fastening means for fastening the flanges with the fins of the corresponding clevises, so as to allow each of the clevises to cooperate with the axial connecting means offset on either side of that clevis.

Furthermore, the outer shroud 121 of the intermediate casing 120 is fastened to the fan casing 140 at the upstream end thereof also using peripheral annular connecting flanges 124, 141 respectively placed on the upstream end of the outer shroud 121 and the downstream end of the fan casing 140.

Each connecting flange 124, 141 comprises a first connecting portion forming a flange and extending in a radial direction and a second tubular connecting portion with a substantially cylindrical shape extending along the direction X of the turbojet engine, such that the longitudinal section of the connecting flange is L-shaped.

However, other forms of the connecting flanges may be proposed.

Each of the connecting flanges 124, 141 protruding outward at the periphery of the outer shroud 121 and the fan casing 140 are pressed against each other using suitable fastening means 150, which may or may not be parallel to the axis X of the turbojet engine and suitable for passing through passages across from each of the connecting flanges 124, 141.

The connecting flange 124 of the outer shroud 121 is thus connected using any known means, such as screwing means, to the connecting flange 141 of the fan casing 140.

Furthermore, irrespective of the form, the different connecting flanges 124, 141 can be associated with centering means making it possible to center the intermediate casing 120 relative to the fan casing 140.

Of course, the present disclosure is not limited solely to the forms of the device described above as examples, but on the contrary encompasses all possible alternatives thereof.

Thus, the present disclosure may be applied to any casing on which clevis mounts 100 for hanger means are designed to be mounted for the suspension of a propulsion unit on a structural element of the aircraft.

Thus, the present disclosure also applies to the attachment assemblies provided on the fan casing or the exhaust casing, for example.

One skilled in the art will appreciate, relative to the attachment assemblies of the prior art, an attachment assembly in which the means forming the axial connection between each clevis mount 100 and the casing 120 are advantageously formed at the outside of the outer shroud 120 of the casing at the periphery thereof.

One thus eliminates any radial fastening means between the clevis mount 100 and the outer shroud 121 of the intermediate casing 120, thereby making it possible to do away with any connection between the outlet guide vanes and the clevis mounts 100.

The non-planar strains to which these assembly connections are subjected are now reacted in the outer peripheral structural elements of the casing 120, such as the connecting flanges 122.

This thereby reduces the risks of deterioration of the casing 120 of the delamination type of the composite material that may form the outer shroud 120 of the intermediate casing.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An assembly for attaching hangers from which an aircraft propulsion unit is suspended, said propulsion unit being suspended from a structural element of the aircraft, said propulsion unit comprising a turbojet engine having a longitudinal axis, said attachment assembly comprising at least one clevis mount and a casing for attaching said hangers to said propulsion unit, characterized in that the casing comprises at least two connecting flanges, a first flange of the at least two connecting flanges placed upstream of the clevis and a second flange of the at least two connecting flanges placed downstream of the clevis, said at least two connecting flanges forming a rigid connection between the clevis mount and the casing at an outer periphery of said casing and along an axis parallel to the longitudinal axis of the turbojet engine.

2. The assembly according to claim 1, characterized in that said at least two connecting flanges forming an axial connection along the longitudinal axis of the turbojet engine comprise:
   at least one first eyelet designed to be secured to the clevis mount;
   at least one second eyelet designed to be secured to the outer periphery of the casing; and
   fasteners suitable for passing through said first and second eyelets along the longitudinal axis of the turbojet engine.

3. The assembly according to claim 2, characterized in that said first eyelet is made in a fin integral with an ear of the clevis.

4. The assembly according to claim 2, characterized in that said second eyelet is made in an outer peripheral structural element of the casing.

5. The assembly according to claim 4, characterized in that the outer peripheral structural element of the casing is a connecting flange, a stiffener or a dedicated structure.

6. The assembly according to claim 1, characterized in that the casing is a fan casing, an intermediate casing or an exhaust casing.

7. The assembly according to claim 4, characterized in that said outer peripheral structural element of the casing is formed on an outer shroud of the intermediate casing.

8. A propulsion unit comprising a turbojet engine suspended from a structural element of an aircraft by a hanger, also comprising an assembly for attaching said hanger on a casing of the propulsion unit according to claim 1.

* * * * *